United States Patent [19]

Morais

[11] Patent Number: 4,992,629
[45] Date of Patent: Feb. 12, 1991

[54] CABLE SHOCK ABSORBING APPARATUS

[76] Inventor: Fortunato R. Morais, 235 Parrott Ave., Bridgeport, Conn. 06606

[21] Appl. No.: 493,876

[22] Filed: Mar. 15, 1990

[51] Int. Cl.[5] .................... F16F 7/00; H02G 15/007
[52] U.S. Cl. .................................. 174/69; 174/37; 174/135; 267/74
[58] Field of Search ............. 174/13, 21 CA, 40 TD, 174/45 TD, 69, 86, 135, 37; 24/71.1, 129 A; 43/42.72; 114/205, 213, 215, 216, 230; 242/129.1; 254/277; 256/39, DIG. 1; 267/69, 73, 74

[56] References Cited
U.S. PATENT DOCUMENTS 1,598,480  8/1926  Deal ........................................ 267/74
1,690,957 11/1928  Tommins ............................... 267/74

FOREIGN PATENT DOCUMENTS 622309 11/1935 Fed. Rep. of Germany ........ 174/69
449157 12/1912 France .................................... 267/73
1431060  1/1966 France .................................... 174/69
710950  7/1966 Italy ...................................... 114/213
1008836  3/1983 U.S.S.R. ................................ 174/37

Primary Examiner—Laramie E. Askin
Attorney, Agent, or Firm—Leon Gilden

[57] ABSTRACT

An apparatus including an elongate three-part housing with end portions separable from a main housing portion. A cable extends through the housing and has a looped portion within the housing. Within the housing is a coil return spring attached at its ends to clamp members affixed to the cable, whereupon a tensioning or stretching of the cable effects separation of the housing portions with subsequent return of the cable to an initial position subsequent to removal of tensioning of the cable.

7 Claims, 4 Drawing Sheets

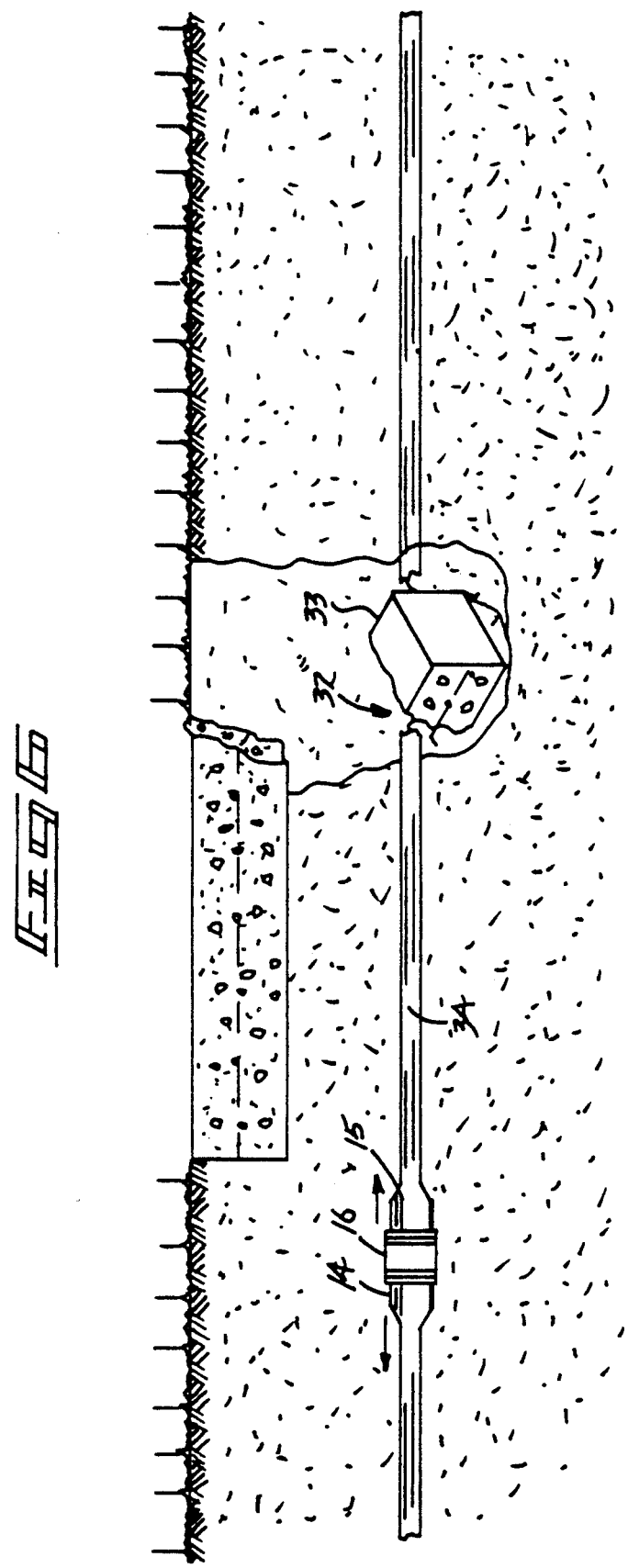

CABLE SHOCK ABSORBING APPARATUS

BACKGROUND OF THE INVENTION

1. Field of the Invention

The field of invention relates to shock absorbing apparatus, and more particularly pertains to a new and improved cable shock absorbing apparatus wherein the same allows an extension and biased reaction of a buried cable organization.

2. Description of the Prior Art

Various cable arrangements are subject to tension during use subjecting such cable to undesirable breakage due to instantaneous tensioning thereof. Buried cable during excavation is subject to breakage as debris is directed upon the cable with the cable tensioned and subsequently broken or fractured during use. The instant invention attempts to overcome such difficulties in unnecessary and costly repair of underground cable, wherein a coiled cable length is mounted within an enclosed housing, wherein the housing includes a biasing member to allow extension and subsequent retraction of the cable. Examples of the prior art include U.S. Pat. No. 2,725,853 to Nordheim wherein a tethering device utilizes a weighted pulley arrangement to allow for extension and retraction of the tethering cable.

U.S. Pat. No. 2,892,282 to Rentz et al. utilizes a shock absorbing mechanism utilized with fishing line, wherein a draw bar is mounted through a housing with a coil spring, with spaced draw bars mounted to the spring to provide for shock accommodating expansion of the spring, with associated fishing line mounted to each end of the spring by the draw bar arrangement.

U.S. Pat. No. 3,774,336 to Dubois provides for a shock absorbing weighted spring arrangement for use with fishing line, wherein a coil spring mounts a fishing line to each end thereof to enable the fishing line to avoid instantaneous shock during a fish strike.

U.S. Pat. No. 4,794,722 to Crevoisier wherein a housing includes a loop mounted to one end of the housing with a piston reciprocatably mounted through the other end of the housing, with the piston biased in normally retracted position within the housing by a coil spring, with fishing line attached to each loop extending from each longitudinal end of the housing.

U.S. Pat. No. 1,084,960 to Randall sets forth a lamp cord reel with a normally biased spool biased in a retracted wound configuration of the lamp cord arrangement.

As such, it may be appreciated that there is a continuing need for a new and improved cable shock absorbing apparatus wherein the same addresses both the problems of ease of use and effectiveness in construction in addressing a need to dampen sudden impacting of underground buried cable, and in this respect, the present invention substantially fulfills this need.

SUMMARY OF THE INVENTION

In view of the foregoing disadvantages inherent in the known types of shock absorbing apparatus for flexible line now present in the prior art, the present invention provides a cable shock absorbing apparatus wherein the same enables instantaneous extension of a looped cable mounted resiliently within a housing to prevent damage to the cable during instantaneous tensioning thereof. As such, the general purpose of the present invention, which will be described subsequently in greater detail, is to provide a new and improved cable shock absorbing apparatus which has all the advantages of the prior art flexible line shock absorbing arrangements and none of the disadvantages.

To attain this, an apparatus is provided including an elongate three-part housing with end portions separable from a main housing portion. A cable extends through the housing and has a looped portion within the housing. Within the housing is a coil return spring attached at its ends to clamp members affixed to the cable, whereupon a tensioning or stretching of the cable effects separation of the housing portions with subsequent return of the cable to an initial position subsequent to removal of tensioning of the cable.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in &he art will appreciate that the conception, upon which this disclosure is based, may readily be utilized as a basis for the designing of other structures, method and systems for carrying out the several purposes of the present invention. It is important, therefore, that the claims be regarded as including such equivalent constructions insofar as they do not depart from the spirit and scope of the present invention.

It is an object of the present invention to provide a new and improved cable shock absorbing apparatus which may be easily and efficiently manufactured and marketed.

It is a further object of the present invention to provide a new and improved cable shock absorbing apparatus which is of a durable and reliable construction.

An even further object of the present invention is to provide a new and improved cable shock absorbing apparatus which is susceptible of a low cost of manufacture with regard to both materials and labor, and which accordingly is then susceptible of low prices of sale to &he consuming public, thereby making such cable shock absorbing apparatus economically available to the buying public.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is an orthographic view illustrating the instant invention in association with underground buried cable.

DESCRIPTION OF THE PREFERRED EMBODIMENT

Figure 1:
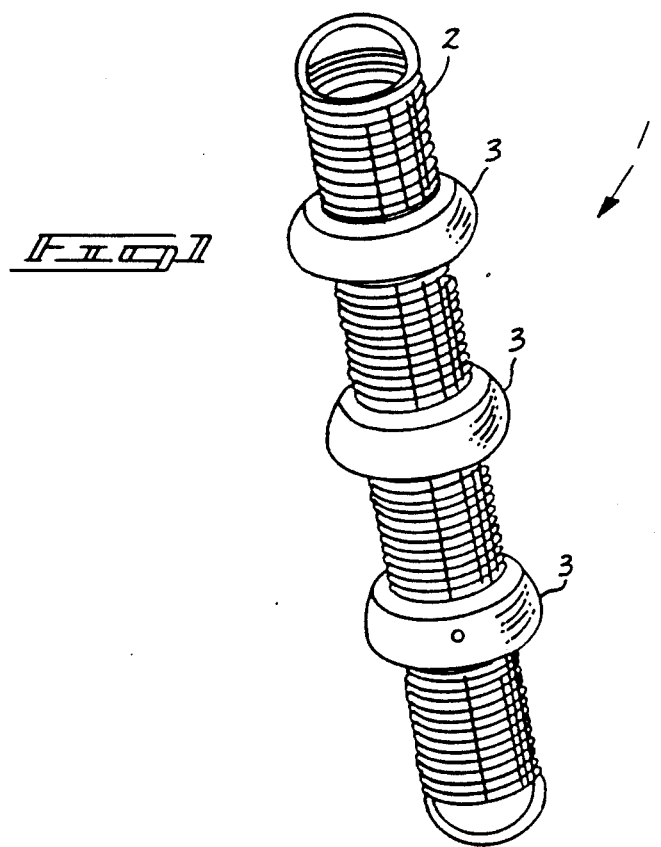
FIG. 1 is an isometric illustration of a prior art line shock absorbing spring member.
Figure 2:
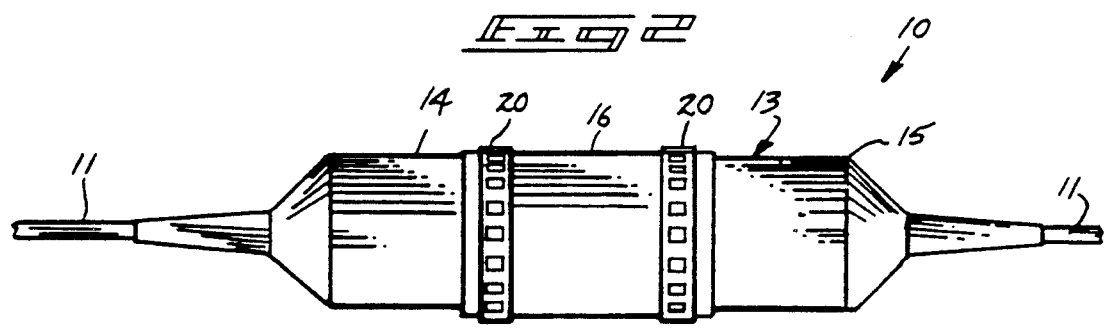
FIG. 2 is an orthographic side view taken in elevation of the instant invention.
Figure 3:
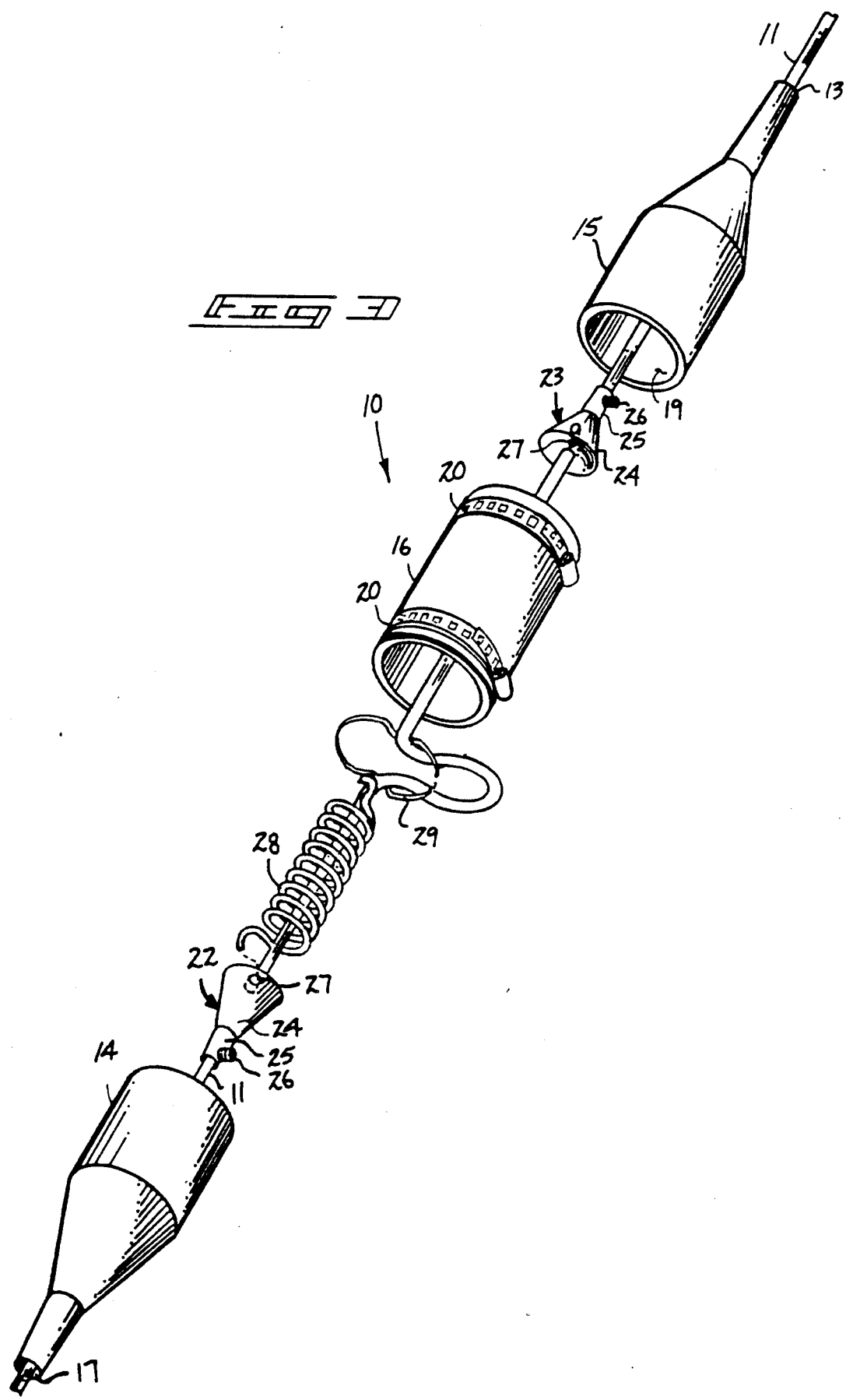
FIG. 3 is an isometric exploded view of the instant invention.

With reference now to the drawings, and in particular to FIGS. 1 to 6 thereof, a new and improved cable shock absorbing apparatus embodying the principles and concepts of the present invention and generally designated by the reference numeral 10 will be described FIG. 1 is illustrative of a typical prior art flexible line shock absorbing mechanism 1, wherein a coil spring 2 includes looped terminal ends for reception of spaced ends of a fishing line to be attached thereto. The members 3 are doughnut shaped weights for use in a fishing organization. The prior art is typical of fishing organizations wherein the fishing line is attached to spaced ends of a shock absorbing mechanism.

More specifically, the cable shock absorbing apparatus 10 of the instant invention essentially comprises a continuous cable 11 directed through a housing 13. The housing 13 includes a first end member 14 oriented in a first direction, with a second end member 15 spaced from the first end member and oriented in a reverse direction, wherein the first and second end members are coaxially and longitudinally aligned relative to one another, with a securement tube 16 securing the first and second end members together utilizing spaced clamps 20. The respective first and second end members 14 and 15 are provided with respective first and second guide opening tubes 17 and 18 of a reduced diameter relative to a predetermined diameter of a chamber opening is defined by each of the first and second end members 14 and 15. The guide opening tubes 17 and 18 are arranged for association with conduit tubing 31, as illustrated in FIG. 6 for example, with the cable 11 directed therethrough.

Figure 4:
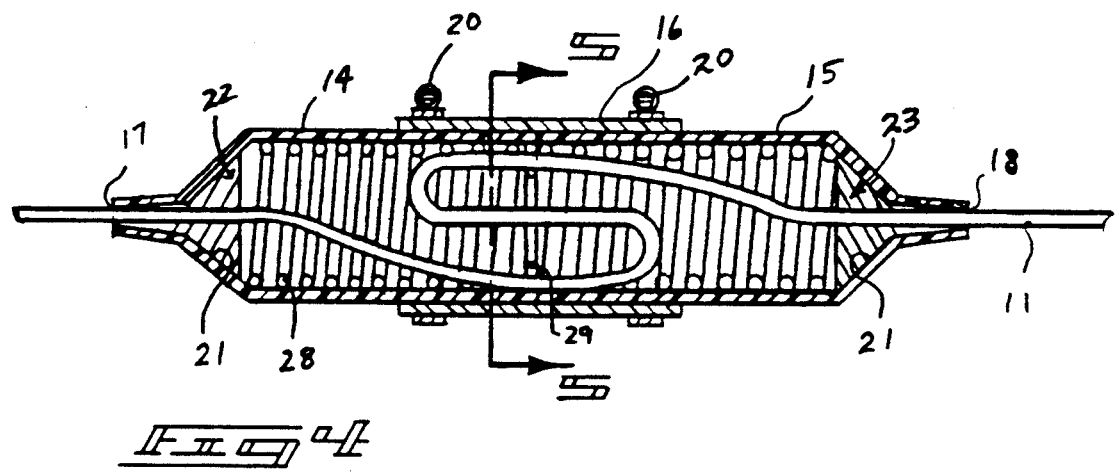
FIG. 4 is an orthographic cross-sectional view of the instant invention.
Figure 5:
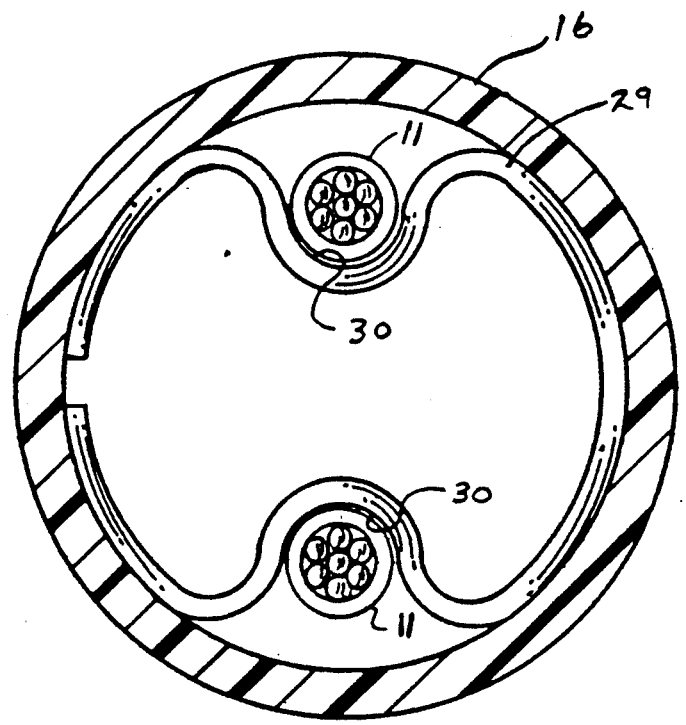
FIG. 5 is an orthographic view taken along the lines 5—5 of FIG. 4 in the direction indicated by the arrows.

The end members 14 and 15 each includes a respective conical interior surface 21 to accommodate an exterior complementary shape of a respective first and second cable clamp 22 and 23 formed with a respective conical body 24 and a coaxially aligned positioning tube 25 to coaxially accommodate the cable 11 therethrough. Each cable clamp 22 and 23 includes a clamp element in the form of a set screw 26 for affixing the cable securely thereto. Each conical body 24 is formed with a spring receiving conduit from the cable conduit directed through the respective cable clamps 22 and 23 to fixedly mount a respective terminal end of a retraction coil spring 28. Each looped end of the retraction coil spring 28 is received within a respective spring receiving conduit 27 to fixedly secure and bias the cable clamps 22 and 28 in a retracted configuration interiorly of the securement tube 16. The cable 11 is looped interiorly of the securement tube 16, as illustrated in FIG. 4, which illustrates the looped portion between the cable clamps 22 and 23 in a somewhat s-shaped configuration. The looped cable 11 is separated by a figure-8 separation clip 29 that is formed with diametrically opposed peripheral "U" shaped recesses 80 that receive and separate the loops of cable 11 relative to one another, as illustrated in FIG. 5 for example.

With reference to FIG. 6, a foreign object such as a slab segment 33 that falls upon the cable conduit tubing 31 at location 32 during an excavation procedure causes separation and extension of the cable clamps 22 and 23 into a spaced configuration, as illustrated in FIG. 4; and should further separation be required due to an even greater tensioning of the cable 11 within the associated conduit tubing 31, the respective first and second end members 14 and 15 may then slidingly separate from the securement tube 16 to allow further expansion thereof with the respective conical cable clamps 22 and 28 nested within the conical interior surfaces 21 of the respective first and second end members 14 and 15.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A cable shock absorbing apparatus permitting extension and subsequent retraction of an elongate cable, wherein the apparatus comprises, an elongate housing member composed of coaxially aligned parts including a first end and a spaced second end and a central securement tube mounted to clampingly secure the first and second ends, and an elongate cable directed longitudinally through the housing member, and a first cable clamp member mounted to the cable interiorly of the housing member, and a second cable clamp member mounted to the cable interiorly of the housing member spaced from the first cable clamp member, and biasing means secured to the first and second cable clamp members to bias the first and second cable clamp members together interiorly of the housing member.

2. An apparatus as set forth in claim 1 wherein the first and second ends of the housing member each includes a cylindrical housing formed with a conically narrowed forward end defining a conical interior, and each of the first and second cable clamp members comprises an exterior conical surface of a complementary configuration to the conically shaped interior of the first and second ends of the housing member.

3. An apparatus as set forth in claim 1 wherein the first and second cable clamp members each includes a through-extending bore receiving the cable therethrough, and further including a clamp element clamping the cable to each first and second cable clamp member, and each first and second cable clamp member each including a spring conduit spaced from the central bore.

4. An apparatus as set forth in claim 3, wherein the biasing means is a coil spring formed with spaced terminal ends, wherein the spaced terminal ends are each respectively received within a respective spring conduit of each respective cable clamp member.

5. An apparatus as set forth in claim 4 wherein the cable is looped interiorly of the housing member in a retracted first position.

6. An apparatus as set forth in claim 5 further including a generally figure-8-shaped spring clip receiving the looped cable thereabout, the spring clip including diametrically opposed "U" shaped recesses receiving the looped cable therewithin and maintaining the looped cable in a spaced, tangle-free relationship within the housing member.

7. An apparatus as set forth in claim 6 wherein the first and second ends each includes a coaxially aligned tubing member for securement of a cable conduit thereto.

* * * * *